April 24, 1945. E. T. RODGERS 2,374,380
INTERNAL-COMBUSTION ENGINE
Filed March 3, 1941 8 Sheets-Sheet 2
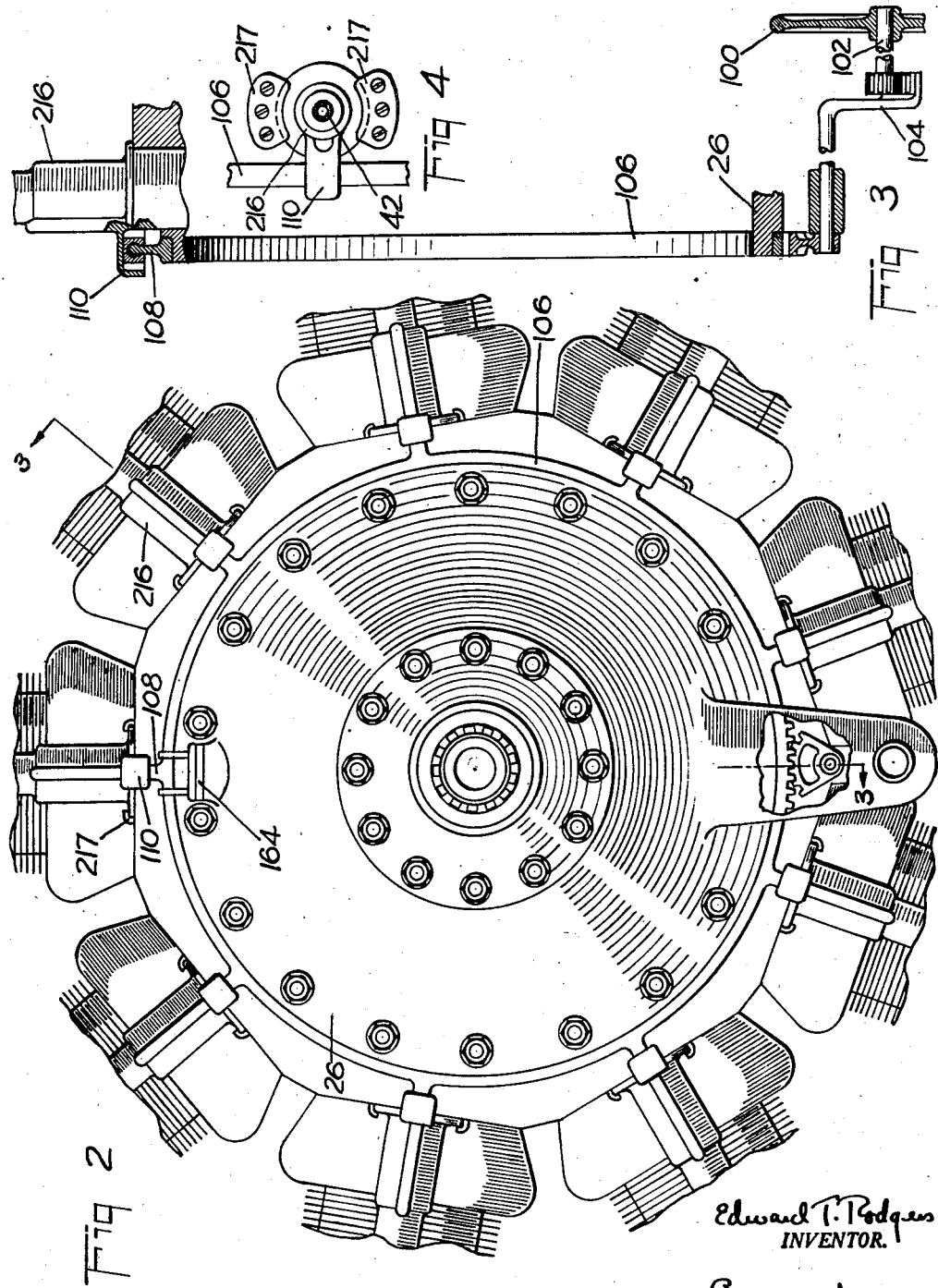

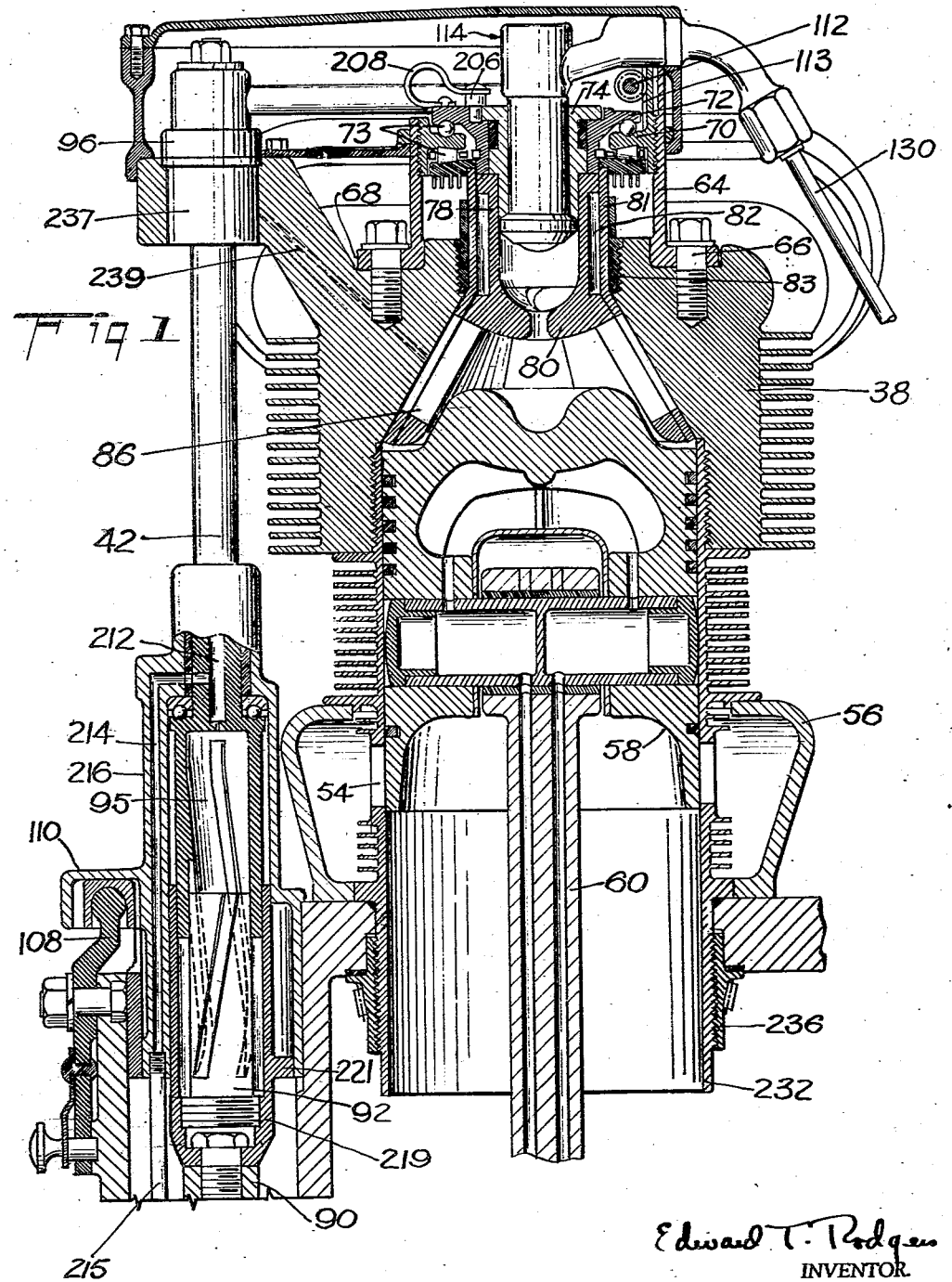

April 24, 1945.　　　E. T. RODGERS　　　2,374,380
INTERNAL-COMBUSTION ENGINE
Filed March 3, 1941　　　8 Sheets-Sheet 3

April 24, 1945. E. T. RODGERS 2,374,380
INTERNAL-COMBUSTION ENGINE
Filed March 3, 1941 8 Sheets-Sheet 4
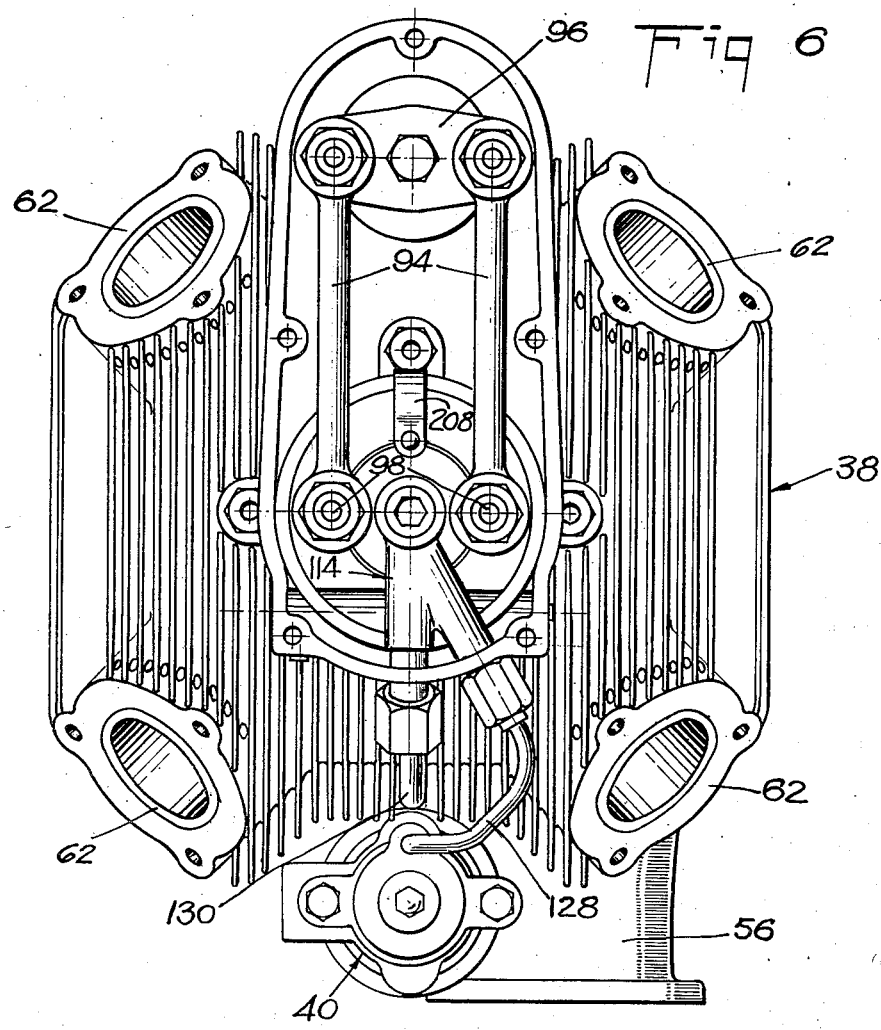
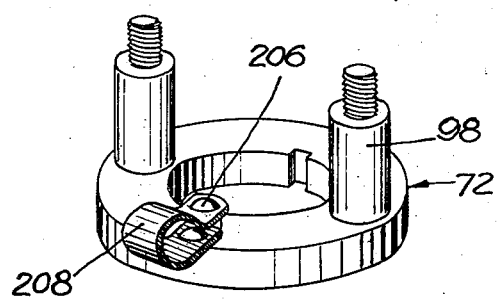
Edward T. Rodgers
INVENTOR.
BY Brown & Jones

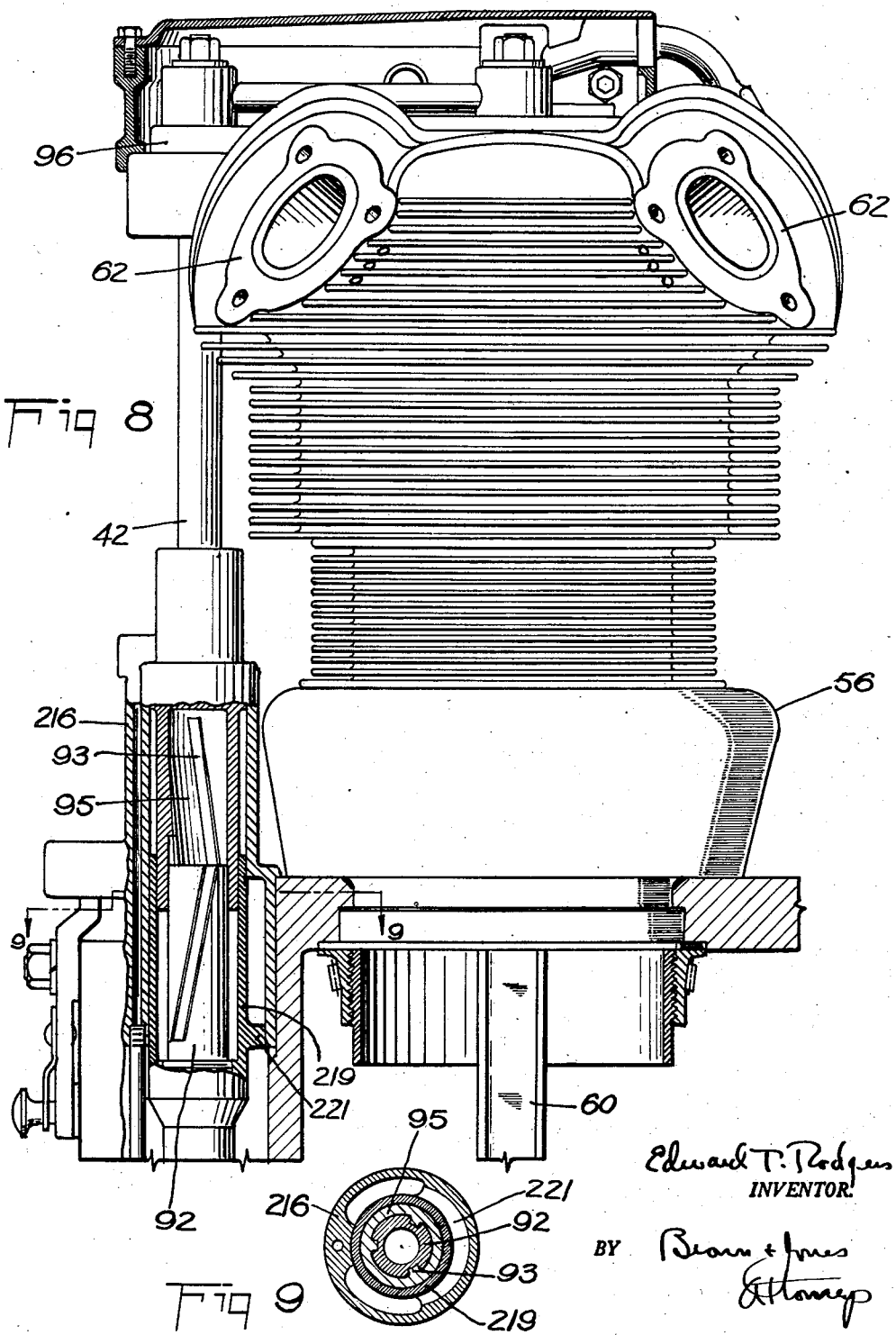

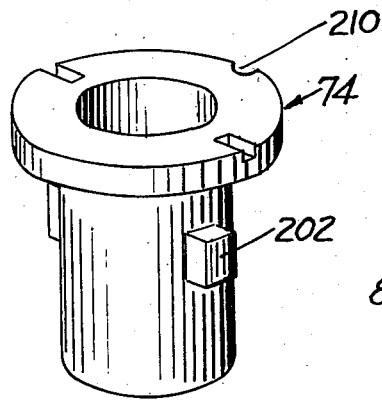
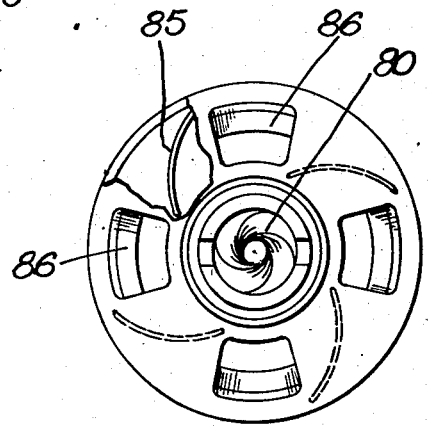
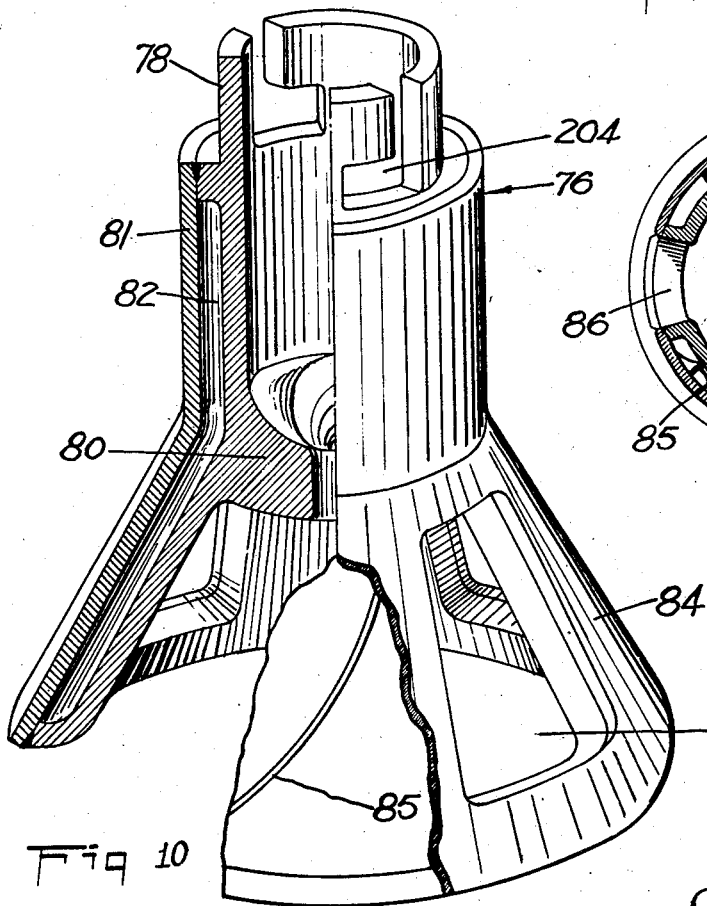
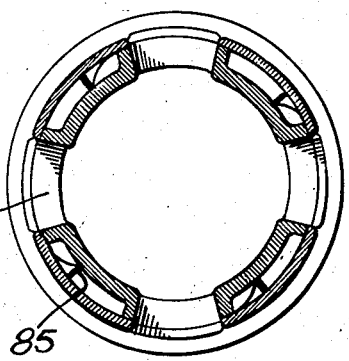

April 24, 1945.  E. T. RODGERS  2,374,380
INTERNAL-COMBUSTION ENGINE
Filed March 3, 1941  8 Sheets-Sheet 7
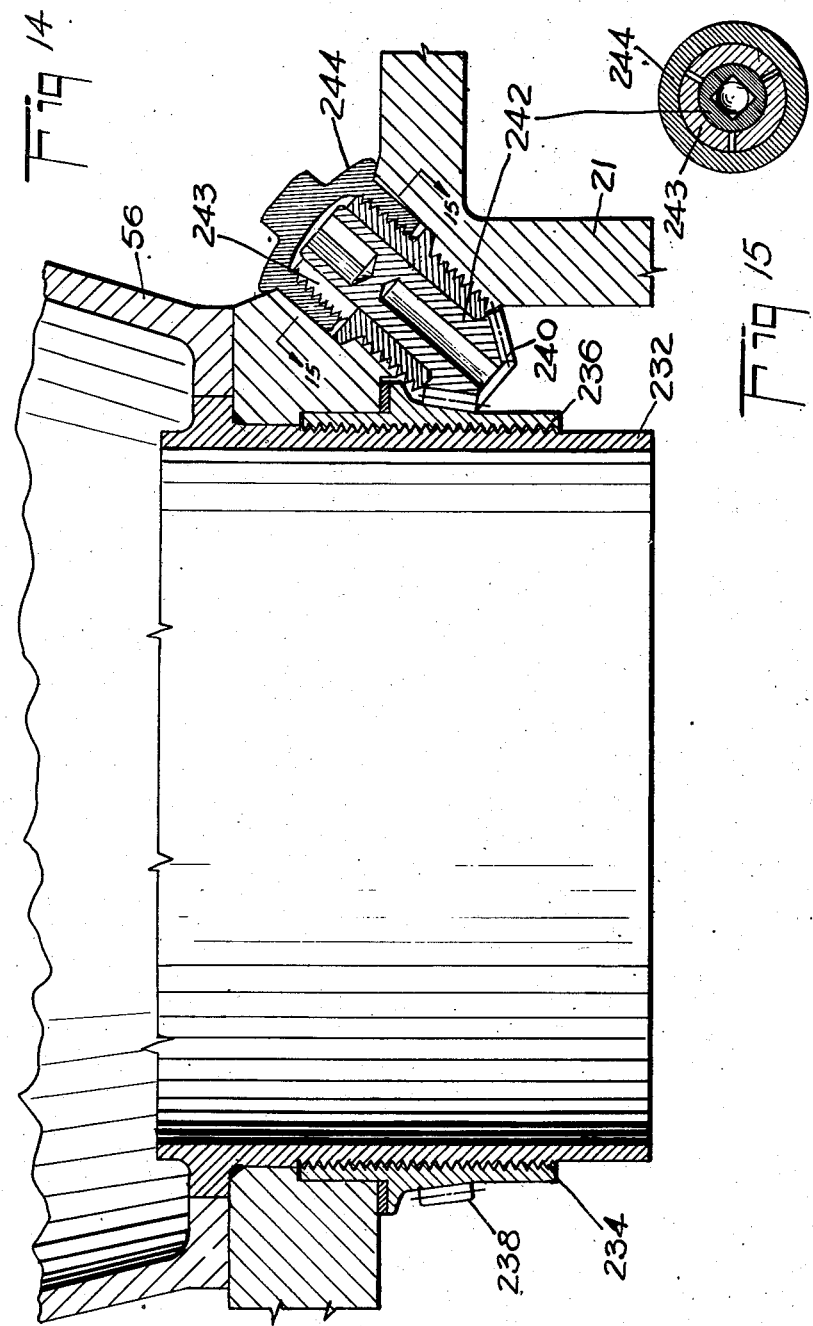

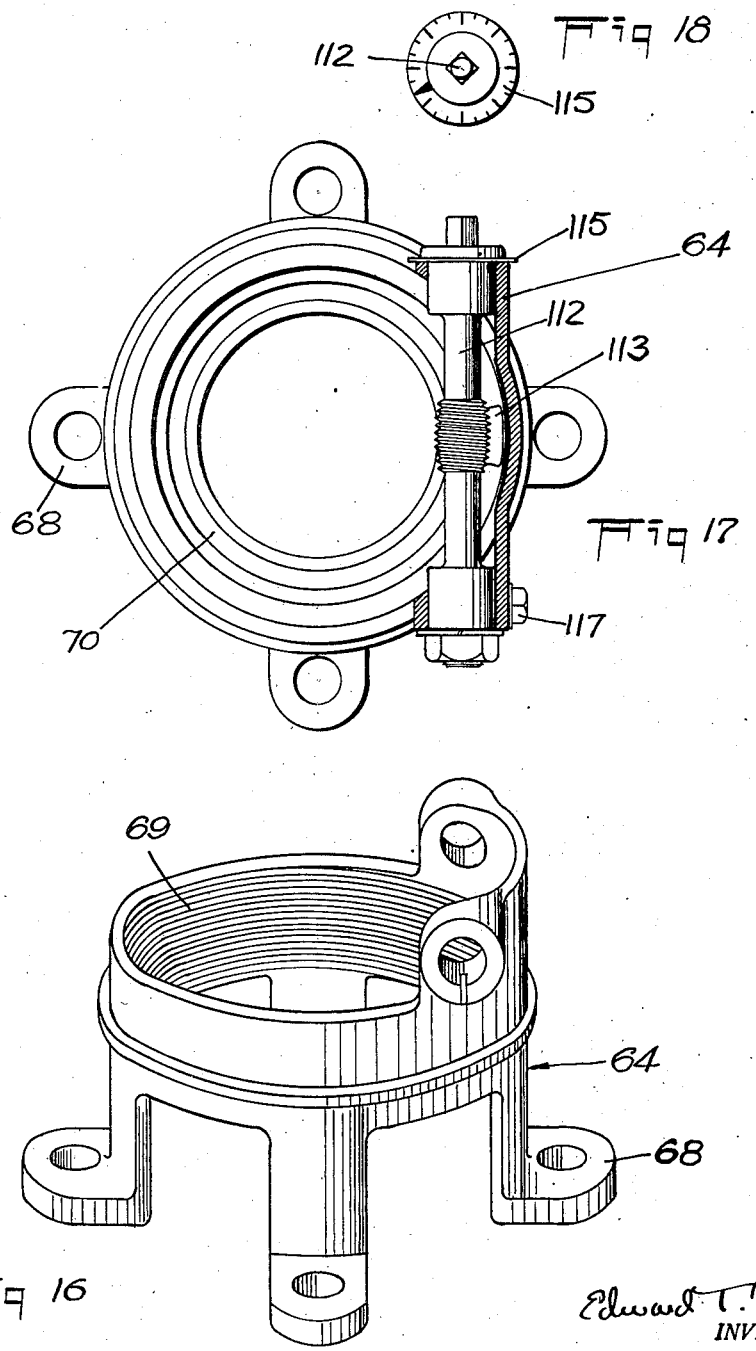

Patented Apr. 24, 1945

2,374,380

UNITED STATES PATENT OFFICE 2,374,380

INTERNAL-COMBUSTION ENGINE

Edward T. Rodgers, New York, N. Y., assignor to Marie Minnie Orr Rodgers

Application March 3, 1941, Serial No. 381,463

9 Claims. (Cl. 123—81)

This invention relates to an internal combustion engine and more specifically to a Diesel engine.

In general, it is an object of the invention to provide a device of the character described, which will efficiently perform the purposes for which it is intended, which is simple and economical of construction, which can be expeditiously, conveniently and safely operated, and which can be readily manufactured and assembled.

Another object of the invention is to provide an oscillating valve which has a plurality of ports and/or which contains salts for the rapid cooling thereof and/or which may be used to control the exhaust gases only and/or which has a precombustion chamber therein; and/or which may be mounted on anti-friction bearings; to provide for said valve a control the parts of which undergo relatively small spacial displacement; to provide an auxiliary manual control for said valve, whereby prompt pressure release may be obtained as desired; to provide a micrometer adjustment for the clearance between said valve and the adjacent cylinder; and to provide means giving such clearance during the oscillation of said valve, and permitting the sealing of said valve and while said valve is not oscillating.

Another object is to provide a mechanical assemblage for efficiently operating a group of auxiliaries with power from the engine.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 1 is a longitudinal cross-sectional view, with parts broken away, of an engine embodying one form of the invention;

Fig. 2 is a front end view in elevation of the engine shown, and as seen from the right, in Fig. 1;

Fig. 3 is a view of a detail shown in Fig. 2, and taken along the line 3—3 in Fig. 2, and of a wheel for operating the same;

Fig. 4 is a view of a portion of the detail shown in Fig. 3;

Fig. 6 is a view of one of the radial cylinders of the engine shown in Fig. 1, taken toward the engine axis and with cover removed;

Fig. 7 is a perspective view of a detail of the cylinder shown in Fig. 5;

Fig. 8 is a view, partly in section, of one of the radial cylinders of the engine shown in Fig. 1, seen along a line which is perpendicular to a radius from the engine axis and which is in a plane perpendicular to that axis;

Fig. 9 is a cross-section of a detail of the cylinder shown in Fig. 6 taken along the line 9—9 of Fig. 8;

Fig. 10 is a perspective view, partly in section and with a portion cut away, of the cone valve shown in Fig. 1;

Fig. 11 is a plan view of the valve shown in Fig. 10 at one-half the scale of Fig. 10.

Fig. 12 is a cross-section of the skirt of the valve shown in Fig. 10;

Fig. 13 is a perspective view of a bushing for locking a nozzle into the stem of the valve shown in Fig. 10;

Fig. 14 is an enlarged longitudinal cross-sectional view. with parts broken away, of the cylinder shown in Fig. 1, said view being taken on a line parallel with the axis of the cylinder showing the manner of securing a cylinder to the crankcase;

Fig. 15 is a cross-section taken along the line 15—15 of Fig. 14;

Fig. 16 is a perspective view of the cage on the head of the engine and shown in Fig. 1;

Fig. 17 is a plan view, partly in section and with additional details of the cage shown in Fig. 16; and Fig. 18 is an end elevation of the dial shown in Fig. 17.

Figure 5:
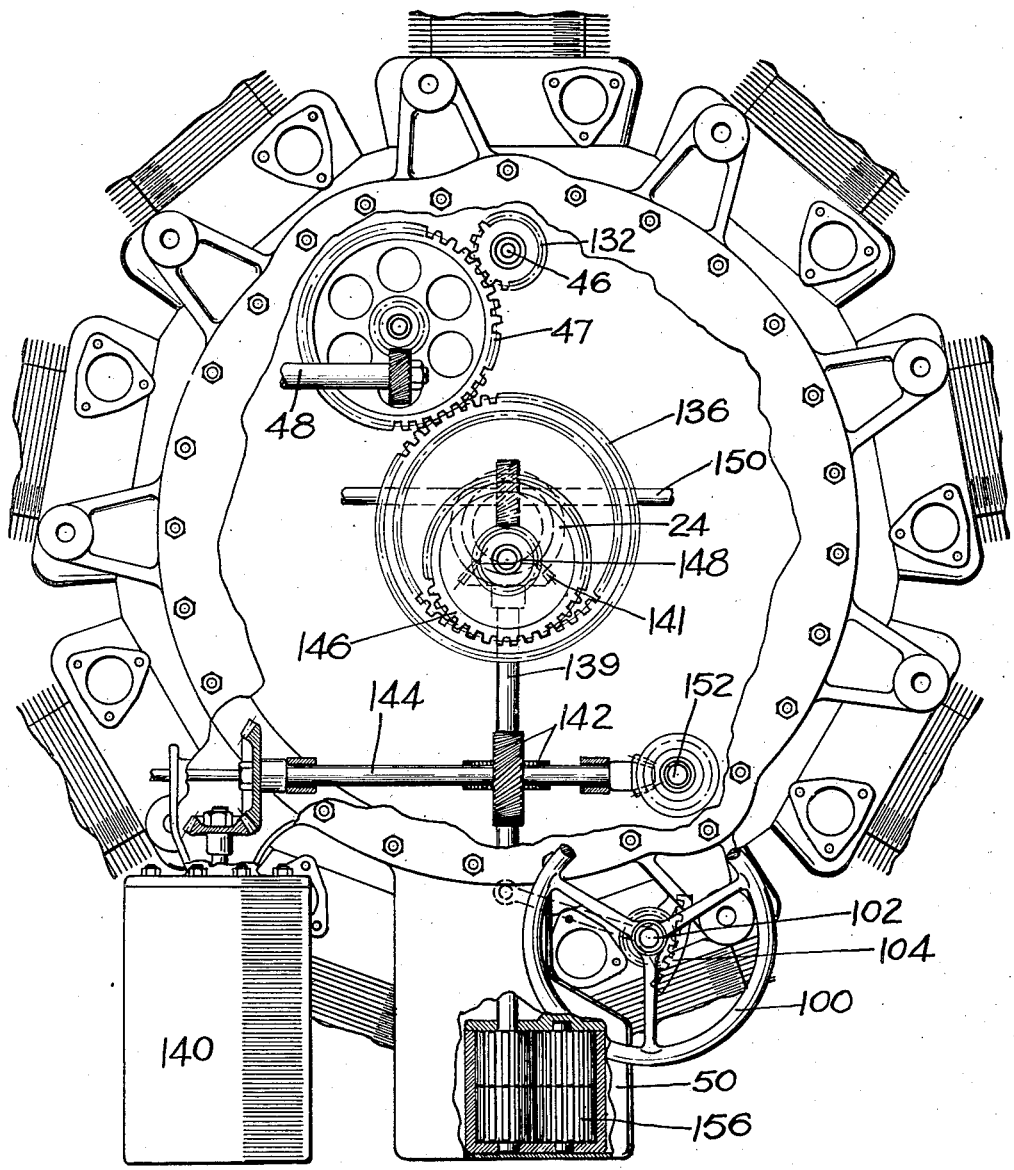
Fig. 5 is a rear end view in elevation of the engine shown, and as seen from the left, in Fig. 1, the rear housing, the super-charger housing and the intake manifold having been removed.

The present invention contemplates various features of an internal combustion engine. Several of these may be employed upon or in connection with a single cylinder. They are described below in as parts of a single row, 9-cylinder radial type, two stroke cycle, uniflow, Diesel aviation engine.

In the drawings 20 denotes a crank case which supports, with suitable intermediate bearings 28, a crank shaft of the single throw type and of two piece construction bolted together, keyed and cottered. The two crank shaft pieces are 22 and 24. A spindle or propeller shaft 30 is carried by the front case 26 at the front end of crank case 20 on bearings 32 and is operated by reduction gearing of the planetary type shown generally at 34. Viewed from the front the crank shaft rotation is counterclockwise.

Each of the cylinders 36 is supported by and through the crank case and is provided with a cylinder head 38, preferably provided with a cone-shaped recess to form a circumambient structure which may operate as a valve seat for a cone valve structure, a fuel pump shown generally at 40, a rod 42 for oscillating the exhaust valve of that cylinder and a fuel injector.

A shaft 46 connects a starting motor 45 to crankshaft 24 there being intermediate gearing described below. Shaft 46 also connects crank shaft 24 with accessories such as an air compressor (not shown) through intermediate gear 47 to the air compressor shaft 48 of a super charger, etc. There is an oil sump 50 in the rear and another 52 in the front.

The cylinder intake ports 54, of which there may be twelve per cylinder, receive air from the air intake manifolds 56 and deliver it to the cylinder when the piston is at the bottom of its stroke and at pressures up to and greater than eight pounds per square inch. A piston 58 in each cylinder delivers power to the crank shaft through its respective connecting rod 60. The piston head is internally oil cooled by oil brought through the connecting rod 60. The burned gases are blown out through four exhaust ports 62 in each cylinder (see Fig. 6).

The fuel injector and exhaust valve mechanisms are shown in detail in Fig. 1. A cage 64 (Figs. 1, 16 and 17) for supporting a cone valve, its adjusting screw and nozzle, which are described hereinafter, is fixed to the top of the cylinder head by any appropriate means such as screws 66 which extend through lugs 68 on the lower side (radially inward with respect to the axis of the whole engine) of the cage. A bearing ring 70 is screwed onto the inside of the cage and carries the valve 76 for the exhaust ports. Antifriction bearings 73, roller and ball, transmit thrust in a direction parallel to the axis of the cylinder between ring 70 and an annulus 72 which is coaxial with the cylinder. Splined into part of the inner surface of said annulus is a bayonet lock bushing 74, which extends beyond the annulus toward the cylinder. A graphite bronze bushing 83 acts as a bearing and lubricates the neck of the cone valve. It extends above the cylinder head within the cage 64 and, depending upon its exposed area, blankets the valve from the cooling air stream and hence determines the temperature at which the valve operates. The air set in motion by the propeller cools the valve, especially in the region of part 81.

A skirt-shaped wall structure, preferably a rotatable cone valve 76 is carried by bushing 74 supported on annulus 72. It comprises an inner shell 78 and an outer sleeve 81 coaxial with the cylinder. The inner shell is formed at one end into dome 80, which points toward the piston and which has helical vanes cut therein. There is a chamber 82 between the inner shell 78 and an outer sleeve 81. The chamber contains one, or more, salts which have high heat conductivity. The valve has a conical skirt 84 which seats against the interior of the head 38, which may be considered a valve seat. Four ports 86 in and at one position of the valve register with the four exhaust ports 62 in the cylinder head. Between ports 86 and in chamber 82 in the skirt 84 there are agitator vanes 85, adapted to cause motion of the salts. These vanes are preferably helical. The salts ride the vanes and are thrown upward.

Means are provided for oscillating the rotatable cone valve. The following are satisfactory: An eccentric 88 on crankshaft 22 moves parallel to the cylinder axis link 90, which reciprocates a piston 92 having three helical grooves 93 in a correspondingly splined cylinder 95, which is thereby oscillated and oscillates rod 42 about its long axis. A pair of arms 94 are each attached at one end to the opposite ends respectively of a bar 96 which is rotated by and coaxially with rod 42. The other end of each arm is attached respectively to one of two posts 98 which are fixed to annulus 72 on opposite sides and both of which extend axially away from the cylinder. By these means the valve 76 is oscillated. The same eccentric 88 operates similar mechanisms for each cylinder in the row. The surfaces of pins 98 are lubricated by wicks in arms 94, which extend into an oil hole 212 in shaft 42, which connects with oil conduit 214 in housing 216 for oscillating element 95. Tube 215, which supplies conduit 214, is flexible to accommodate the motion of housing 216. A conduit 239 (not shown) extends from hole 212 through bushing 237 and through the cylinder head 38, for example through that portion 238 thereof which is shaped like an arm to support shaft 42. Conduit 236 opens upon the valve seat 240.

The respective exhaust cone mono valves for the respective cylinders can be given a partial rotation simultaneously, out of regular function, by a control 100 at the rear of the engine which operates the oscillating rods 42 that actuate the valves 76. This control causes all valves to be opened up to 22½ degrees at the will of the operator, giving a prompt pressure release to all the cylinders. The control on wheel 100 (see Figs. 1, 2, 3 and 4) turns shaft 102 which turns the quadrant gear 104 and the latter meshing with teeth on annulus 106 moves that annulus. The annulus 106 rotates on the surface of front case 26 and about the engine axis. A plurality of fingers 108 extends out from said annulus and are, respectively, universally connected to collars which are integral with housings 216 for rods 42. Housings 216 are secured to the crank case by plates 217. A manual displacement of control 100 moves parts 102, 104, 106, 108, 110 and 216. The housing 216, for the valve oscillator mechanism, rotates on its own axis and turns sleeve 219 by means of the eccentric lug 221 integral with the sleeve and bearing on the inner housing surface (see Figs. 1 and 9). Grooved piston 92, threaded to and coaxial with sleeve 219, turns with sleeve 219 and causes splined cylinder 95 to turn and with it shaft 42. In this fashion, cone valve 76 is thrown out of its cycle manually to relieve the compression at the starting of the engine.

As stated above, the exhaust mono valves are mounted on ball and roller bearings, in an adjustable mount. Valves can be adjusted for a clearance of, say, 1/1000 of an inch by a micrometer adjustment, so that this clearance exists between the cone-shaped valve seat (preferably provided by the cone-shaped recess in the circumambient cylinder head structure) and the cone-shaped valve during the time the valve is being turned, i. e., opened and closed. However, when the valve is closed and compression mounts, the valve moves upward 1/1000 of an inch and seals under the pressure of the cylinder compression. The valve is not moved until the expiration of the firing stroke when the compression and exhaust pressure is relieved. Then 1/1000 of an inch automatically obtains. The motion of a worm on shaft 112 (see Figs. 1 and 17), meshing with rim teeth 113 on ring 70 causes the ring to rotate about its axis. Ring 70 has external threads which mesh with internal threads 69 on cage 64. The cage being fixed, the supported valve 76 moves axially to give the above mentioned clearance when shaft 112 is turned, and supported valve 76 moves parallel to the cylinder axis to give the said clearance. A dial 115 and index are provided at the end of shaft 112. Shaft 112 may be manually operated by the application of a suitable tool to the end of said shaft and that shaft can be locked by any convenient means such as locking bolt 117.

The fuel injector nozzle 114 lies along the cylinder axis, with the bushing 74 and supported from the top of cage 64.

Means are provided for releasably locking fuel injector nozzle 114 whereby it may be readily removed. The bushing 74 has two lugs 202 on its circumference which fit into bayonet slot 204 in the inner shell 78 of the cone valve. There is a further, positive lock consisting of a peg 206 held in place by spring 208 in a notch 210 positioned in the bushing 74.

Fuel pump 40 may be operated by a cam on the engine shaft 24.

The auxiliaries are grouped for main accessibility at the back of the engine and consist of engine lubrication oil pump and filters, high pressure oil pump for operating the air screw mechanism, electric generator, combined air and hand starter, cylinder pressure release device, dual fuel pump and twin filters to feed the high pressure pumps that are radially mounted and which supply each cylinder, oil pressure gauge connection, oil feed auxiliary filter, the tachometer drive and an air compressor. Auxiliary shaft 46 (see Fig. 5) carries gear 132 which meshes with idler gear 47, on an idling shaft. The latter meshes with crank shaft gear 136. Gear 47, through an appropriate train, operates the air compressor crank shaft 48.

Generator 140 is run from crank shaft 124 through a gear train which includes bevel gears 141, mounted on shaft 139, and helical gears 142 and cross shaft 144. Cross shaft 144 transmits power to tachometer shaft 152. Shaft 139 also operates oil pump 156 in sump 50. Shaft 144, extending outside the crankcase outside casing 21, runs a fuel supply pump, not shown.

A displacement type supercharger is driven by the internal teeth on gear 136 on main shaft 24. Said teeth mesh with gear 146 mounted on the supercharger shaft 148.

There is provided a gun synchronizer take-off shaft 150 adapted to derive power from supercharger shaft 148.

The cage 64 on the cylinder head may have openings whereby the outer shell 81 of the cone valve 76 is exposed (see Fig. 16).

Means are provided for the easy installation and removal of the threaded barrel. These means do away with the necessity for the many bolts which have been heretofore required to hold the cylinder in the crank case. The cylinder barrel 232 is formed with an external thread 234 on which is screwed a threaded collar 236. The latter has gear teeth 238 on its outer surface, which mesh with pinion 240, the integral shaft 242 of which rotates in bushing 243 which is threadedly fixed in casing 21. The outer end of bushing 243 is split and has an external taper thread on which the internal thread of cap 244 operates. This locking cap may be turned manually by any convenient toll. Shaft 242 has an end adapted to receive a wrench, after cap 244 has been removed, whereby pinion 230 is turned manually and the cylinder barrel is brought into or removed from its place.

The passage between the precombustion chamber and the combustion chamber is designed to give high swirl to the gases passing therethrough. It preferably gives a screw feed effect. The form shown in Figs. 1 and 11, for example, is such that a suitably sized plurality of helical vanes could be screwed into said passage.

The arm which supports shaft 42 sometimes becomes heated and expands. In order to prevent this expansion from doing harm to shaft 42 the latter may be axially slidable in and splined to an annulus integral with bar 96 and between bushing 237 and shaft 42. The expansion may be taken up by the spring loaded bar 96; there being a spring between the bar 96 and a nut on the head of the shaft 42.

Since certain changes may be made in the above construction and different embodiments of the inevntion could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A valve mechanism for an internal combustion engine comprising, in combination, a circumambient structure providing a cone-shaped recess and having an exhaust passage extending therethrough to communicate with the recess, a skirt-shaped wall structure nested in the recess with said circumambient structure to cooperate therewith upon relative rotary motion and having an exhaust valve port opening extending therethrough to communicate with the exhaust passage in certain angular positions of one structure relative to the other, and means rotatably mounting one of said structures on the other comprising means mounted on one of said structures determining the relative axial positions of said structures in both axial directions and providing clearance therebetween during relative rotary motion, the clearance being of such dimension as to permit said structures to be forced together by compression and explosive force when said structures are not relatively rotating.

2. A valve mechanism for an internal combustion engine comprising, in combination, a circumambient structure providing a cone-shaped recess and having an exhaust passage extending therethrough to communicate with the recess, a skirt-shaped wall structure nested in the recess with said circumambient structure to cooperate therewith upon relative rotary motion and having an exhaust valve port opening extending therethrough to communicate with the exhaust passage in certain angular positions of one structure relative to the other, and means rotatably mounting one of said structures on the other comprising means mounted on one of said structures axially adjustable with respect thereto and adapted to be fixed in any one of a plurality of axial positions, said means determining the relative axial positions of said structures in both axial directions and providing clearance therebetween during relative rotary motion, the clearance being of such dimension as to permit said structures to be forced together by compression and explosive force when said structures are not relatively rotating.

3. A valve mechanism for an internal combustion engine comprising, in combination, a circumambient structure providing a cone-shaped recess and having an exhaust passage extending therethrough to communicate with the recess, an elastic skirt-shaped wall structure nested in the recess with said circumambient structure to cooperate therewith upon relative rotary motion and having an exhaust valve port opening extending therethrough to communicate with the exhaust passage in certain angular positions of one structure relative to the other, and means rotatably mounting one of said structures on the other comprising means mounted on one of said structures determining the relative axial positions of said structures in both axial directions and providing clearance therebetween during relative rotary motion, the elasticity of said second-mentioned structure being of such quality and the clearance being of such dimension as to permit said structures to be forced together by compression and explosive force when said structures are not relatively rotating.

4. A valve mechanism for an internal combustion engine comprising, in combination, a circumambient structure providing a cone-shaped recess and having an exhaust passage extending therethrough to communicate with the recess, a skirt-shaped wall structure nested in the recess with said circumambient structure to cooperate therewith upon relative rotary motion and having an exhaust valve port opening extending therethrough to communicate with the exhaust passage in certain angular positions of one structure relative to the other, and means rotatably mounting one of said structures on the other comprising a bearing ring threadably mounted on one of said structures for axial adjustment with respect thereto, means to rotate said ring relative to the structure on which is mounted and lock it in any one of a plurality of axial adjusted positions, said bearing ring cooperating with means on the other of said structures to determine the relative axial positions of said structures in both axial directions and providing clearance therebetween during relative rotary motion, the clearance being of such dimension as to permit said structures to be forced together by compression and explosive force when said structures are not relatively rotating.

5. A valve mechanism for an internal combustion engine comprising, in combination, a circumambient valve seat structure providing a cone-shaped recess and having an exhaust passage extending therethrough to communicate with the recess, a rotatable cone-shaped valve structure nested in the recess with said valve seat structure and having an exhaust valve port opening extending therethrough to communicate with the exhaust passage in certain angular positions of said valve structure, and means rotatably supporting said cone-shaped valve structure with clearance between said structures during rotation of said valve structure, said means maintaining the clearance during valve rotary motion with the clearance being of such dimension as to permit said valve structure to be forced against said seat structure for tight engagement therewith by compression and explosive force when said valve structure is not rotating.

6. A valve mechanism for an internal combustion engine comprising, in combination, a circumambient valve seat structure providing a cone-shaped recess and having an exhaust passage extending therethrough to communicate with the recess, a rotatable cone-shaped valve structure nested in the recess with said valve seat structure and having an exhaust valve port opening extending therethrough to communicate with the exhaust passage in certain angular positions of said valve structure, and bearing means structure mounted on a portion of said valve structure rotatably supporting said cone-shaped valve structure with clearance between said structures during rotation of said valve structure, said bearing means structure normally preventing axial movement in both directions of the bearing-supported portion of said valve structure to provide the clearance when said valve structure is not subjected to compression and explosive force, the elasticity of at least one of said structures being of such quality and the clearance being of such dimension as to permit said valve structure to be forced by compression and explosive force against said seat structure for tight engagement therewith.

7. In an internal combustion engine the combination comprising, a cylinder head having a cone-shaped recess therein providing a valve seat and exhaust passages extending therethrough to communicate with the recess, a rotatable cone-shaped valve nested in the recess with said valve seat and having exhaust valve port openings extending therethrough to communicate with the exhaust passages in certain angular positions of said valve, a valve stem fixed to said valve and rotatably mounted in said head, spaced apart means mounted on said stem, and bearing structure mounted on said head positioned between said means rotatably supporting said valve in a position providing clearance between said valve and seat during rotary motion of said valve and normally preventing axial movement in both directions of said valve stem to provide the clearance when said valve is not subjected to compression and explosive force, at least parts of said valve and mounting means assembly being of such elasticity and the clearance being of such dimension as to permit said valve to be forced by compression and explosive force against said seat for tight engagement therewith.

8. In an internal combustion engine the combination comprising, a cylinder head having a cone-shaped recess therein providing a valve seat and exhaust passages extending therethrough to communicate with the recess, a rotatable cone-shaped valve nested in the recess with said valve seat and having exhaust valve port openings extending therethrough to communicate with the exhaust passages in certain angular positions of said valve, a valve stem fixed to said valve and rotatably mounted in said head, a pair of spaced-apart circumferential bearing flanges normally mounted in fixed positions on said stem, a bearing ring mounted on said head and having a circumambient flange rotatably mounted between said bearing flanges to prevent axial movement in both directions of said stem relative to said ring, said ring being mounted for axial adjustment on said head to provide predetermined clearance between said valve and seat during rotary motion of said valve, and means to hold said ring in adjusted position whereby there is provided clearance of such dimension as to permit said valve to be forced by compression and explosive force against said seat.

9. In an internal combustion engine the combination comprising, a cylinder head having a valve seat and an exhaust passage extending therethrough, a rotatable valve adapted to cooperate with said seat and having an exhaust valve port opening extending therethrough to communicate with the exhaust passage in certain angular positions of said valve, a valve stem fixed to said valve and rotatably mounted in said head, a rotary structure demountably attached to said stem and having a pair of circumferential bearing flanges normally mounted in fixed spaced-apart positions thereon, a bearing ring threadably mounted on said head for axial movement when rotated, a circular flange fixed on said ring and rotatably received between said circumferential flanges to prevent axial movement in both directions of said stem relative to said ring, and means to rotate said ring to provide predetermined clearance between said valve and seat and to hold it in adjusted position whereby is provided clearance of such dimension as to permit said valve to be freely rotated and to be forced by compression and explosive force against said seat when said valve is not rotating.

EDWARD T. RODGERS.